(12) United States Patent
Bigot-Astruc et al.

(10) Patent No.: US 7,483,613 B2
(45) Date of Patent: Jan. 27, 2009

(54) CHROMATIC DISPERSION COMPENSATING FIBER

(75) Inventors: Marianne Bigot-Astruc, Marcousis (FR); Louis-Anne De Montmorillon, Versailles (FR); Denis Molin, Draveil (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 7 days.

(21) Appl. No.: 11/934,451

(22) Filed: Nov. 2, 2007

(65) Prior Publication Data

US 2008/0107426 A1    May 8, 2008

(30) Foreign Application Priority Data

Nov. 3, 2006    (FR) .................................. 06 09616

(51) Int. Cl.
  *G02B 6/02* (2006.01)
  *G02B 6/36* (2006.01)
  *H04J 14/02* (2006.01)
  *H04B 10/12* (2006.01)
  *H04B 10/00* (2006.01)

(52) U.S. Cl. .................. 385/123; 385/126; 398/81; 398/148; 398/159

(58) Field of Classification Search ......... 385/123–127; 398/81, 147, 148, 159
See application file for complete search history.

(56) References Cited

U.S. PATENT DOCUMENTS

| 6,366,728 | B1 | 4/2002 | Way et al. |
| 6,574,407 | B2 | 6/2003 | Sillard et al. |
| 6,873,798 | B1 | 3/2005 | Pilipetskii et al. |
| 7,031,581 | B2 * | 4/2006 | Saitou et al. ................. 385/123 |
| 7,099,541 | B2 * | 8/2006 | Terahara et al. ............. 385/100 |
| 7,187,824 | B2 | 3/2007 | Fleury et al. |
| 2002/0159119 | A1 | 10/2002 | Fries et al. |
| 2006/0051039 | A1 | 3/2006 | Wei |
| 2008/0107426 | A1 | 5/2008 | Bigot-Astruc et al. |

FOREIGN PATENT DOCUMENTS

| EP | 1213595 | A2 | 6/2002 |
| EP | 1278316 | A1 | 1/2003 |
| EP | 1383256 | A | 1/2004 |
| EP | 1919106 | A1 | 5/2008 |
| WO | 02/056069 | A2 | 7/2002 |

OTHER PUBLICATIONS

H.P. Hsu and R.B. Chesler "Trisection Wide Spectral Band Fiber Dispersion Compensation", IEEE Photonics Technology Letters, vol. 4, N°4, Apr. 1992.

(Continued)

*Primary Examiner*—Sung Pak
*Assistant Examiner*—Daniel Petkovsek
(74) *Attorney, Agent, or Firm*—Summa, Allan & Additon, P.A.

(57) ABSTRACT

Disclosed are an improved system and a related method for compensating the chromatic dispersion of a given length of a transmission fiber over a given spectral band by employing at least two chromatic dispersion compensating fibers that, with respect to the slope of the slope of the chromatic dispersion ($SS_i$), have values of opposite signs.

10 Claims, 5 Drawing Sheets

OTHER PUBLICATIONS

Lars Grüner-Nielsen et al., "Module for Simultaneous C+L Band Dispersion Compensation And Raman Amplification," 2002 OFC Conference, Mar. 19, 2002.

Jean-Christophe Antona et al., "Impact of Imperfect Wideband Dispersion Compensation on the Performance of WDM Transmission Systems at 40 Gbit/s," 2006 ECOC Conference, Sep. 28, 2006.

French Search Report and Written Opinion in counterpart French Application No. 0609616, dated Jun. 15, 2007.

European Search Report for corresponding European Application No. 07021356, dated Dec. 27, 2007.

* cited by examiner

CHROMATIC DISPERSION COMPENSATING FIBER

CROSS-REFERENCE TO PRIORITY APPLICATION

This application hereby claims the benefit of pending French Application No. 06/09616 (filed Nov. 3, 2006 at the French Patent Office), which is hereby incorporated by reference in its entirety.

FIELD OF THE INVENTION

The present invention relates to the area of optical fiber transmission and, more specifically, to the compensation of the chromatic dispersion, of the chromatic dispersion slope, and of the slope of the chromatic dispersion slope in optical fiber transmission systems.

BACKGROUND OF THE INVENTION

For optical fibers, the index profile is generally qualified in relation to the tracing of the graph plotting the function that associates the refractive index with the fiber radius. Conventionally, the distance r to the center of the fiber is shown along the abscissa, and the difference between the refractive index and the refractive index of the fiber cladding is shown along the ordinate axis. The index profile is therefore referred to as a "step" profile, a "trapezoidal" profile, or a "triangular" profile for graphs having the respective shapes of a step, a trapezoid, or a triangle. These curves are generally representative of the theoretical or set profile of the fiber. The fiber manufacturing stresses may lead to a slightly different profile.

An optical fiber conventionally includes an optical core, whose function is to transmit and possibly to amplify an optical signal, and an optical cladding, whose function is to confine the optical signal within the core. For this purpose, the refractive indexes of the core $n_c$ and the outer cladding $n_g$ are such that $n_c > n_g$. As is well known, the propagation of an optical signal in a single-mode optical fiber decomposes into a fundamental mode guided in the core and into secondary modes (i.e., cladding modes) guided over a certain distance in the core-cladding assembly.

In high bit-rate, wavelength-multiplexed transmission systems, it is advantageous to manage the chromatic dispersion, particularly for rates of 10 Gbits/s or higher. The objective for all multiplex wavelength values is to achieve an accumulated chromatic dispersion that is substantially zero on the link in order to limit pulse broadening. "Accumulated chromatic dispersion" is the integral of the chromatic dispersion with respect to the fiber length; chromatic dispersion being constant, the accumulated chromatic dispersion is equal to the product of the chromatic dispersion multiplied by the length of the fiber. It is also advantageous in the vicinity of the wavelengths used in the system to avoid zero values of the local chromatic dispersion for which the non-linear effects are stronger. Finally, it is also advantageous to limit the accumulated chromatic dispersion slope over the multiplex range so as to avoid or to limit distortions between the multiplex channels. This slope is conventionally the derivative of the chromatic dispersion over the wavelength.

As line fibers for optical fiber transmission systems, single-mode fibers (SMF) or Non-Zero Dispersion Shifted Fibers (NZDSF+) are conventionally employed. NZDSF+ fibers are dispersion shifted fibers having a non-zero, positive chromatic dispersion for the wavelengths at which they are used, typically around 1550 nm.

To compensate the chromatic dispersion and the chromatic dispersion slope in SMF or NZDSF+ fibers used as line fibers, short lengths of Dispersion Compensating Fiber (DCF) can be used. When choosing a DCF, it is generally sought that the ratio of the chromatic dispersion over the dispersion slope of the compensating fiber is substantially equal to that of the line fiber. This ratio is designated by the abbreviation DOS, which stands for Dispersion Over Slope ratio. The smaller the DOS ratio of a transmission fiber, the more difficult it is to compensate the dispersion and the dispersion slope with a DCF.

Also, the chromatic dispersion value for a DCF is not generally a linear function of the wavelength. In contrast, the chromatic dispersion is a substantially linear function of wavelength in line fibers. It is therefore also sought to limit the slope of the slope of the chromatic dispersion, in particular at high bit rates and/or for long-haul transmissions. This slope of the slope is conventionally the second derivative of the chromatic dispersion with respect to the wavelength. In this context the term Residual Dispersion (RD) is given to the value of the chromatic dispersion measured at the end of the line for a given wavelength. Typically, the residual dispersion is zero at a reference wavelength (e.g., 1550 nm) and increases with the wavelengths distant from this reference wavelength owing to a non-zero slope of the chromatic dispersion slope in the compensating fiber. In this context, the term maximum residual dispersion ($RD_{max}$) is given to the maximum value of residual dispersion in a spectral band under consideration.

The influence of the slope of the slope of the chromatic dispersion has been identified in the prior art. For example, European Publication No. EP 1,213,595 A (and its counterpart U.S. Pat. No. 6,574,407) propose laying down criteria not only for the dispersion over slope ratio (DOS) of the compensating fiber but also for the ratio of the slope over the slope of the dispersion slope at a wavelength of 1570 nm to reduce the absolute value of the residual chromatic dispersion in the C and L bands. This, however, applies only to a single DCF and is added to the constraint on the ratio of the dispersion over the dispersion slope (DOS). Consequently, this disclosure does not provide a significant reduction in the absolute value of the residual dispersion. In addition, its exemplary fibers possess DOS values of more than 150 nm.

Also, several prior art documents propose combining several portions of different dispersion compensating fibers to reach targeted accumulated values of chromatic dispersion and chromatic dispersion slope.

For example, European Publication No. EP 1,278,316 A1 proposes a dispersion compensating module which includes several compensating fibers having different dispersion and slope values to offset the manufacturing fluctuations of the fibers. Similarly, International Publication No. WO 2002/056069 A2 (and its counterpart U.S. Pat. No. 6,873,798) propose using two compensating fibers having different dispersion and slope values. The article by H. P. Hsu and R. B. Chesler "Trisection Wide Spectral Band Fiber Dispersion Compensation", IEEE Photonics Technology Letters, Vol. 4, No. 4, April 1992, proposes associating three fibers having different dispersion and slope values to produce a transmission fiber having very low dispersion and dispersion slope values. The slope of the slope of the dispersion is not taken into consideration however in these documents, and a residual dispersion persists.

U.S. Publication No. 2002/0159119 proposes a system for compensating the chromatic dispersion comprising a plurality of compensating fibers to compensate the dispersion and the dispersion slope in the transmission line. This document also proposes taking higher order effects into consideration, and to use as many compensating fibers as orders to be compensated.

The association of several compensating fibers has also been proposed to allow a compensation of chromatic dispersion over several spectral bands. For example, European Publication No. EP 1,383,256 A (and its counterpart U.S. Pat. No. 7,187,824) propose a dispersion compensating module that includes several sub-modules with different compensating fibers to allow a compensation of chromatic dispersion over one or more spectral bands. "Module for Simultaneous C+L Band Dispersion Compensation And Raman Amplification," (Lars Grüner-Nielsen et al; Article No. TUJ6), presented at the 2002 OFC Conference on Mar. 19, 2002, proposes using a compensating module with two compensating fibers to allow a compensation of chromatic dispersion over the two spectral bands C and L. The slope of the slope of the dispersion, however, is not taken into consideration in these documents, and so a residual dispersion persists.

It has also been established that the lower the DOS ratio, the higher the absolute value of residual dispersion RD on a given spectral band. To achieve a low DOS, the dispersion slope must be relatively high at the reference wavelength. This imposes a slope of the slope that is relatively high. Reference may be made, for instance, to "Impact of Imperfect Wideband Dispersion Compensation on the Performance of WDM Transmission Systems at 40 Gbit/s," (Jean-Christophe Antona et al; Article No. Th1.6.4), presented at the 2006 ECOC Conference on Sep. 28, 2006. This article reports absolute values of residual dispersion in relation to the DOS value for different compensating fibers.

FIG. 1, which depicts the absolute value of the maximum residual dispersion $RD_{max}$ for different DOS values in the C+ spectral band (i.e., 1530 nm to 1570 nm), illustrates this finding. The curve shown in a thin dashed line reproduces the absolute value of the maximum residual dispersion obtained with a conventional compensating fiber. The curve shown in a thick solid line reproduces the absolute value of the maximum residual dispersion obtained with the association of two compensating fibers as proposed by the present invention. FIG. 1 clearly shows that with a conventional prior art compensating fiber, the absolute value of the residual dispersion is high when the DOS is low and is non-zero for higher DOS values.

SUMMARY OF THE INVENTION

Therefore, a need exists for a system to compensate chromatic dispersion with which it is possible to strongly reduce—and perhaps even cancel—the absolute value of the residual chromatic dispersion on a given spectral band.

For this purpose, the present invention proposes limiting itself to a given spectral band in which the line fiber (i.e., the transmission fiber) has a chromatic dispersion that is a linear function of the wavelength, and in which the compensating fiber has a chromatic dispersion that is a parabolic function of the wavelength. The present invention, therefore, proposes using several compensating fibers of which at least two have slope of the slope values of opposite signs in order to compensate—at least partly and perhaps fully—the effects of the slope of the dispersion slope.

With reference to FIG. 1, it is noted that the association of two dispersion compensating fibers (i.e., DCF connection to the optical transmission system) makes it possible to strongly reduce the absolute value of the maximum residual dispersion for low DOS and to cancel the maximum residual dispersion for transmission systems having higher DOS values.

More particularly, the present invention proposes an optical transmission system over a given spectral band. The system includes: (i) a given length ($L_0$) of an optical transmission fiber having, at a median wavelength ($\lambda_0$) of the given spectral band, a given chromatic dispersion value $D_0(\lambda_0)$ and a given chromatic dispersion slope value $S_0(\lambda_0)$; and (ii) at least two chromatic dispersion compensating fibers ($DCF_i$) of respective length ($L_i$), the chromatic dispersion compensating fibers in communication with the optical transmission fiber (i.e., directly or indirectly connected), each dispersion compensating fiber having, at the medium wavelength ($\lambda_0$), values of chromatic dispersion $D_i(\lambda_0)$ and chromatic dispersion slope $S_i(\lambda_0)$ that substantially satisfy the following equations:

$$D_0(\lambda_0) \cdot L_0 + \sum_i (D_i(\lambda_0) \cdot L_i) = 0 \text{ ps/nm}$$

$$S_0(\lambda_0) \cdot L_0 + \sum_i (S_i(\lambda_0) \cdot L_i) = 0 \text{ ps/nm}^2$$

and wherein at least two of the dispersion compensating fibers have values for the slope of the dispersion slope $SS_i(\lambda_0)$ of opposite signs (i.e., positive and negative values).

According to one embodiment, the slope of the slope of the dispersion values ($SS_i$) of the compensating fibers ($DCF_i$) also substantially satisfy the following equation:

$$\left| \frac{\sum_i (SS_i(\lambda_0) \cdot L_i)}{L_0} \right| < 0.002 \text{ ps/nm}^3/\text{km}$$

According to another embodiment, the given spectral band has a spectral width that is 40 nm or less (e.g., a spectral width of about 35 nm). It is within the scope of the invention for the given spectral band to have a spectral width of 30 nm or less (e.g., 20 nm or less).

According to yet another embodiment, the given spectral band is chosen from among all or part of the C band (e.g., 1530 nm to 1565 nm), the C+ band (e.g., 1530 nm to 1570 nm), the L band (e.g., 1565 nm to 1625 nm), and the S band (e.g., 1460 nm to 1530 nm).

The present invention also proposes a method for compensating the chromatic dispersion of a given length ($L_0$) of transmission fiber over a given spectral band. The method includes the following steps: (i) selecting at least two chromatic dispersion compensating fibers (DCFi), each having a given value of slope of the slope of dispersion (SSi) at a median wavelength ($\lambda_0$) of the given spectral band, at least two dispersion compensating fibers being chosen with values of slope of the dispersion slope SSi ($\lambda_0$) of opposite signs; (ii) assembling given lengths ($L_i$) of each dispersion compensating fiber (and connecting the dispersion compensating fibers to the transmission fiber), the dispersion compensating fibers being selected and the lengths of each selected fiber being chosen to substantially satisfy the following equation:

$$\left| \frac{\sum_i (SS_i(\lambda_0) \cdot L_i)}{L_0} \right| < 0.002 \text{ ps/nm}^3/\text{km}$$

According to one embodiment, the dispersion compensating fibers (DCF$_i$) are chosen to substantially satisfy the following equations:

$$D_0(\lambda_0) \cdot L_0 + \sum_i (D_i(\lambda_0) \cdot L_i) = 0 \text{ ps/nm}$$

$$S_0(\lambda_0) \cdot L_0 + \sum_i (S_i(\lambda_0) \cdot L_i) = 0 \text{ ps/nm}^2$$

wherein $D_i(\lambda_0)$ and $S_i(\lambda_0)$, respectively, are the dispersion and the dispersion slope values of the compensating fibers at the median wavelength ($\lambda_0$) of the given spectral band, and wherein the transmission fiber of length ($L_0$) has, at a median wavelength ($\lambda_0$) of the given spectral band, a given chromatic dispersion $D_0(\lambda_0)$ and a given chromatic dispersion slope $S_0(\lambda_0)$.

The foregoing, as well as other characteristics and advantages of the present invention, and the manner in which the same are accomplished, are further specified within the following detailed description and its accompanying drawing.

DETAILED DESCRIPTION

Figure 1:
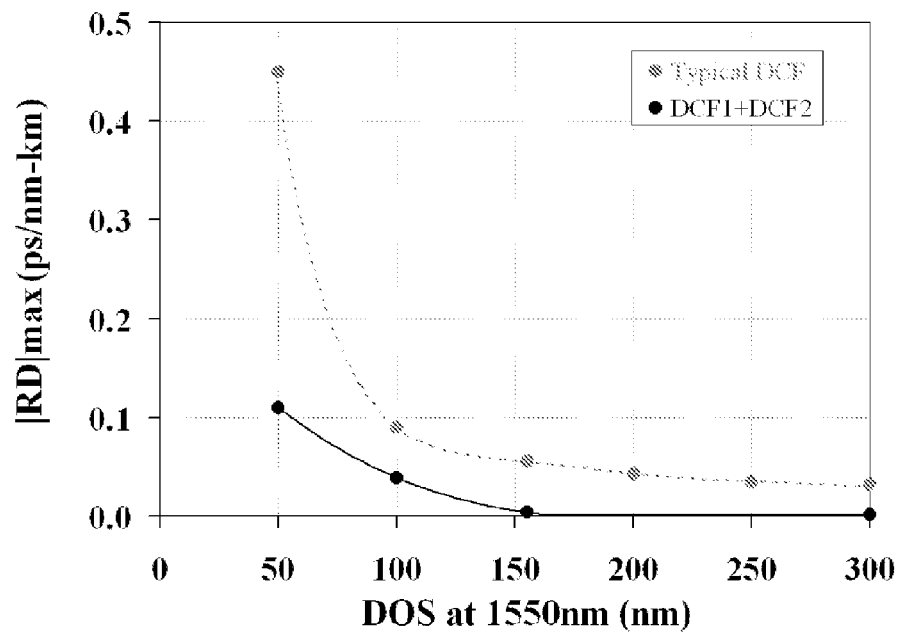
FIG. 1 illustrates the absolute value of the maximum residual dispersion (RD$_{max}$) for different DOS values in the C+ spectral band.

In one aspect, the present invention embraces an improved system to compensate chromatic dispersion over a given spectral band. In another aspect, the present invention embraces a method for compensating the chromatic dispersion of a given length of a transmission fiber over a given spectral band.

To compensate the chromatic dispersion and the chromatic dispersion slope accumulated in an optical line fiber over a given spectral band, and for any ratio of the chromatic dispersion over the dispersion slope (DOS), the present invention may employ (i.e., associate with a transmission fiber) at least two dispersion compensating fibers, hereunder denoted DCF$_i$, and more often DCF$_1$ and DCF$_2$. At least two of these compensating fibers are chosen with slope of the slope of dispersion values of opposite signs (i.e., positive and negative) in order to compensate the dispersion slope variations in the compensating fibers. Therefore, the absolute value of the residual chromatic dispersion (RD) may be greatly reduced on the spectral band under consideration.

The present invention is primarily directed to a given spectral band, which may be all or part of the C+ band, the L band, the S band, to allow accurate modeling of the dispersion in relation to the wavelength on this given spectral band. In addition, it may be useful to apply the present invention to other optical bands, such as the O band (e.g., 1260 nm to 1360 nm), the E band (e.g., 1360 nm to 1460 nm), or the U band (e.g., 1625 nm to 1675 nm).

As noted, a line fiber typically has a variation in chromatic dispersion in relation to the wavelength that is substantially linear. That is, dispersion of a line fiber in relation to the wavelength may be expressed as follows:

$$D_0(\lambda) = D_0(\lambda_0) + S_0(\lambda_0) \cdot (\lambda - \lambda_0) \tag{1}$$

wherein $D_0$ is the chromatic dispersion, $S_0$ is the chromatic dispersion slope in the line fiber, and $\lambda_0$ is the median wavelength of the spectral band under consideration.

This modeling (equation 1) of the chromatic dispersion in relation to the wavelength for a line fiber may be considered as an approximation if a broad spectral band is considered. On the other hand, if a limited spectral bandwidth is considered (e.g., a width about 40 nm or less), this linear modeling of the chromatic dispersion in relation to the wavelength is relatively accurate—perfect accuracy being impossible to obtain given the higher order effects that may come into consideration.

As mentioned previously, however, a compensating fiber does not generally show a linear variation in the chromatic dispersion in relation to the wavelength. On the other hand, on a limited spectral band, it can be considered that a compensation fiber has a chromatic dispersion that is a parabolic function of the wavelength.

In this regard, the dispersion of a compensating fiber in relation to the wavelength may be expressed as follows:

$$D_i(\lambda) = D_i(\lambda_0) + S_i(\lambda_0) \cdot (\lambda - \lambda_0) + SS_i(\lambda_0) \cdot \frac{(\lambda - \lambda_0)^2}{2} \tag{2}$$

wherein $D_i$ is the chromatic dispersion, $S_i$ is the chromatic dispersion slope, $SS_i$ is the slope of the slope of the dispersion in the compensating fiber, and $\lambda_0$ is the median wavelength of the spectral band under consideration.

This modeling (equation 2) of the chromatic dispersion as a function of the wavelength for a compensating fiber is inaccurate if a very broad spectral band is considered. As illustrated in FIGS. 3-7, the chromatic dispersion spectra in relation to the wavelength for the compensating fibers have points of inflection that clearly show that the slope of the slope of the dispersion does not remain constant irrespective of the wavelength chosen. On the other hand, if a limited spectral bandwidth is chosen (e.g., 40 nm or less), this parabolic modeling of the chromatic dispersion as a function of the wavelength is relatively accurate.

The present invention therefore proposes a solution for an optimal compensation of the chromatic dispersion over a given spectral band (i.e., with an absolute value of residual dispersion that is largely reduced, even cancelled, in this given spectral band compared with the solutions provided by known, prior art compensating fibers).

Irrespective of the compensating fiber used in the prior art systems, the slope of the slope of the dispersion could not be fully cancelled, which de facto led to a residual dispersion. It arises from the aforementioned relationships (1) and (2) that the dispersion values $D_0$, $D_i$ can compensate each other just like the dispersion slope values $S_0$, $S_i$, but the slope of the slope of the dispersion $SS_i$ introduced by the compensating fiber itself remains and introduces residual dispersion.

Some NZDSF fibers (e.g., the fiber marketed by Corning under the trademark LEAF) have a very low DOS, in the order of 50 nm at 1550 nm. Because these line fibers are used in long-haul transmissions at high bit rates, it is important to be able to compensate the chromatic dispersion accumulated in these fibers with a compensating fiber having a DOS value that is just as low.

The present invention, therefore, puts forward a solution for an improved compensation of the chromatic dispersion on a given spectral band, irrespective of the DOS value of the line fiber to be compensated. Most high bit-rate transmission systems (i.e., which the absolute value of the residual chromatic dispersion must be maximally reduced) operate on one or more given spectral bands that are relatively limited. Thus, the dispersion compensation system of the present invention is particularly well adapted to such transmission systems.

In particular, the present invention embraces using at least two compensating fibers for an optimal compensation not only of the dispersion and dispersion slope of the line fiber, but also for a compensation of the slope of the slope of the dispersion between the compensating fibers used. This was not possible with a single DCF. Therefore, the absolute value of the residual dispersion can be significantly reduced and perhaps even cancelled.

In particular, the present invention proposes selecting the dispersion compensating fibers $DCF_i$ so that the following equations can be observed at a median wavelength $\lambda_0$ of the spectral band under consideration:

$$D_0(\lambda_0) \cdot L_0 + \sum_i (D_i(\lambda_0) \cdot Li) = 0 \text{ ps/nm} \quad (3)$$

$$S_0(\lambda_0) \cdot L_0 + \sum_i (S_i(\lambda_0) \cdot Li) = 0 \text{ ps/nm}^2 \quad (4)$$

$$\sum_i (SS_i(\lambda_0) \cdot Li) = 0 \text{ ps/nm}^3 \quad (5)$$

wherein $L_0$ is the length of the line fiber and $L_i$ the lengths of the compensating fibers used.

In the particular case in which only two dispersion compensating fibers are used, it follows from equations (3) and (4) that it is possible to optimize the length $L_1$, $L_2$ of each compensating fiber used in the system by respecting the following equations:

$$L_1 = L_0 \cdot \frac{[S_0(\lambda_0) \cdot D_2(\lambda_0) - D_0(\lambda_0) \cdot S_2(\lambda_0)]}{[S_2(\lambda_0) \cdot D_1(\lambda_0) - D_2(\lambda_0) \cdot S_1(\lambda_0)]} \quad (6)$$

$$L_2 = L_0 \cdot \frac{[S_0(\lambda) \cdot D_1(\lambda_0) - D_0(\lambda_0) \cdot S_1(\lambda_0)]}{[D_2(\lambda_0) \cdot S_1(\lambda_0) - S_2(\lambda_0) \cdot D_1(\lambda_0)]} \quad (7)$$

From these equations (6) and (7), and from equation (5), an optimal ratio can be determined for values of the slope of the slope of the chromatic dispersion when two compensating fibers are used, in accordance with the following equation:

$$\frac{SS_2(\lambda_0)}{SS_1(\lambda_0)} = \frac{D_0(\lambda_0) \cdot S_2(\lambda_0) - S_0(\lambda_0) \cdot D_2(\lambda_0)}{D_0(\lambda_0) \cdot S_1(\lambda_0) - S_0(\lambda_0) \cdot D_1(\lambda_0)} \quad (8)$$

If this equation (8) is satisfied, then the residual dispersion over all the spectral band under consideration will be zero. It is possible that this equation (8) may not be fully satisfied because of other constraints imposed on the $DCF_i$ fibers, such as constraints on the effective area, the bend losses or the cut-off wavelength, which influence the dispersion values $D_1$, $D_2$ and the dispersion slope values $S_1$, $S_2$ of the compensating fibers. But in all cases, the values of the slope of the slope of the dispersion $SS_1$ and $SS_2$ must have opposite signs.

The residual dispersion RD on the spectral band under consideration is then expressed according to the following relationship:

$$RD(\lambda) = \frac{\sum_i (SS_i(\lambda_0) \cdot L_i)}{2L_0} (\lambda - \lambda_0)^2 \quad (9)$$

In accordance with the foregoing, the present invention will be illustrated (below) with four detailed examples. So as not to encumber the description, however, only the dispersion spectra of the second example are illustrated in the figures.

Figure 2:
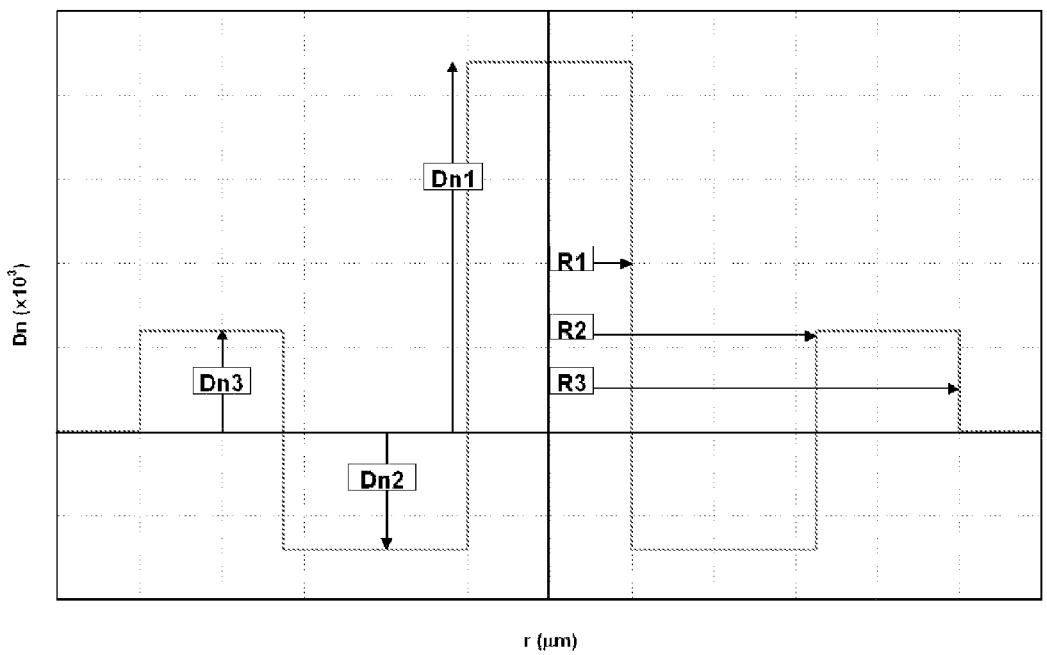
FIG. 2 illustrates the set profile of dispersion compensating fibers according to the present invention.
Figure 3:
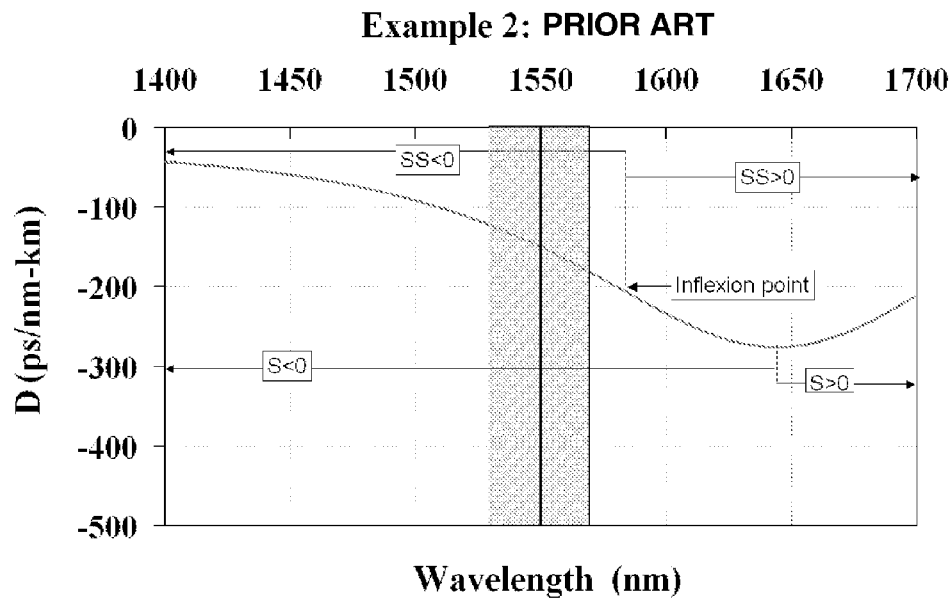
FIG. 3 illustrates the dispersion spectrum of a prior art compensating fiber having a DOS of 100 nm at 1550 nm.
Figure 4:
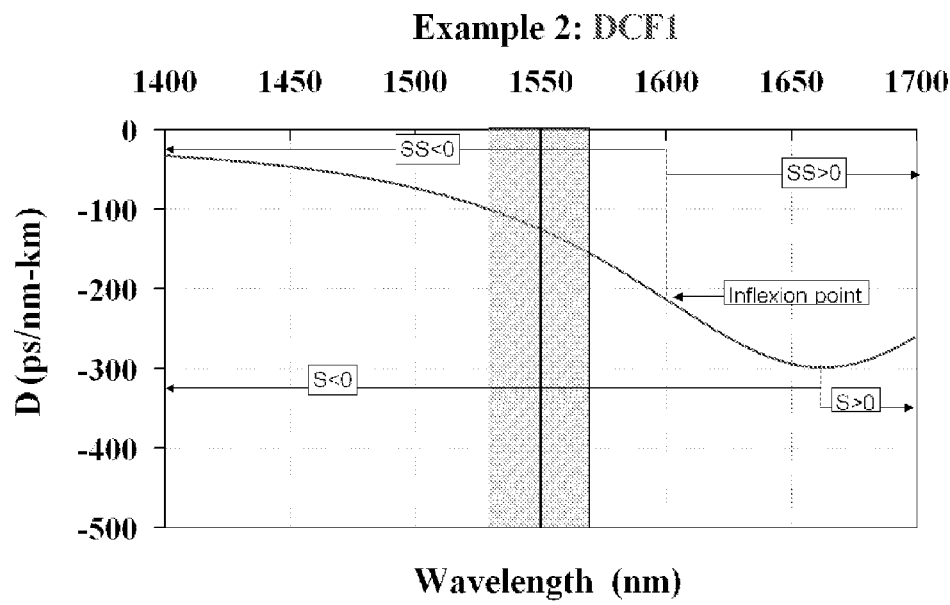
FIGS. 4 and 5 illustrate the dispersion spectra of two compensating fibers associated according to the present invention to compensate the dispersion of a line fiber having a DOS of 100 nm at 1550 nm.
Figure 5:
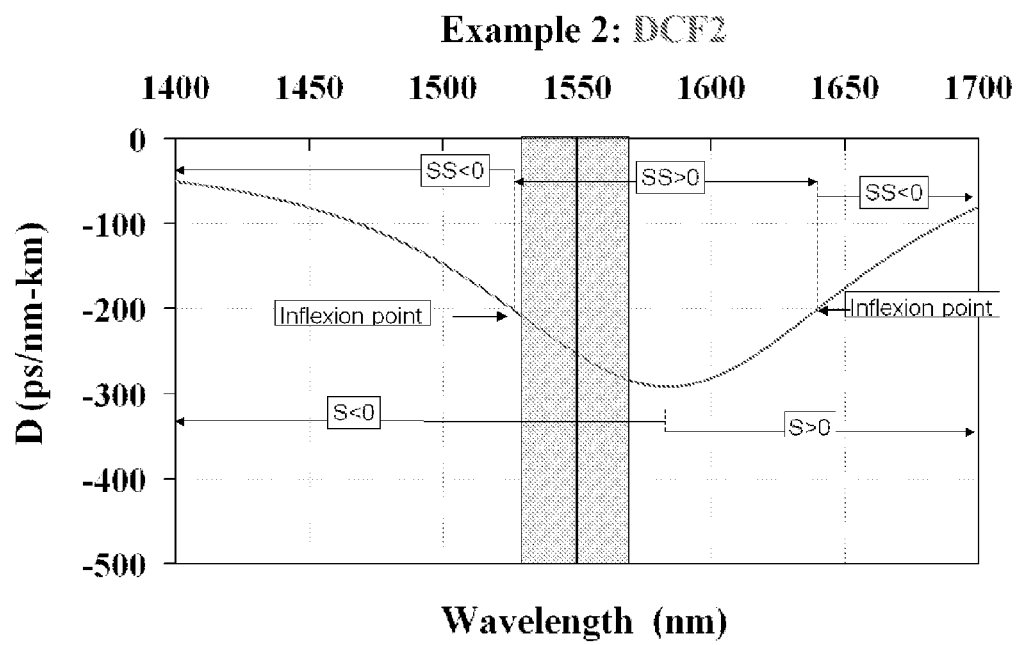
Figure 6:
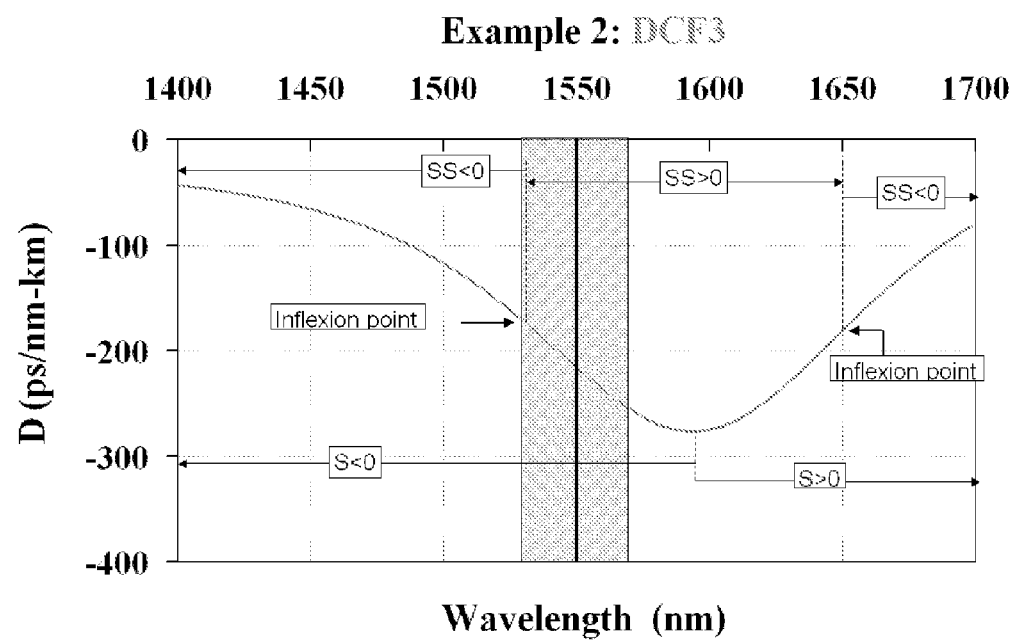
FIG. 6 illustrates the dispersion spectrum of another compensating fiber that may be associated according to the present invention with the fibers depicted in FIGS. 4 and 5 to compensate the dispersion of a line fiber having a DOS of 100 nm at 1550 nm.
Figure 7:
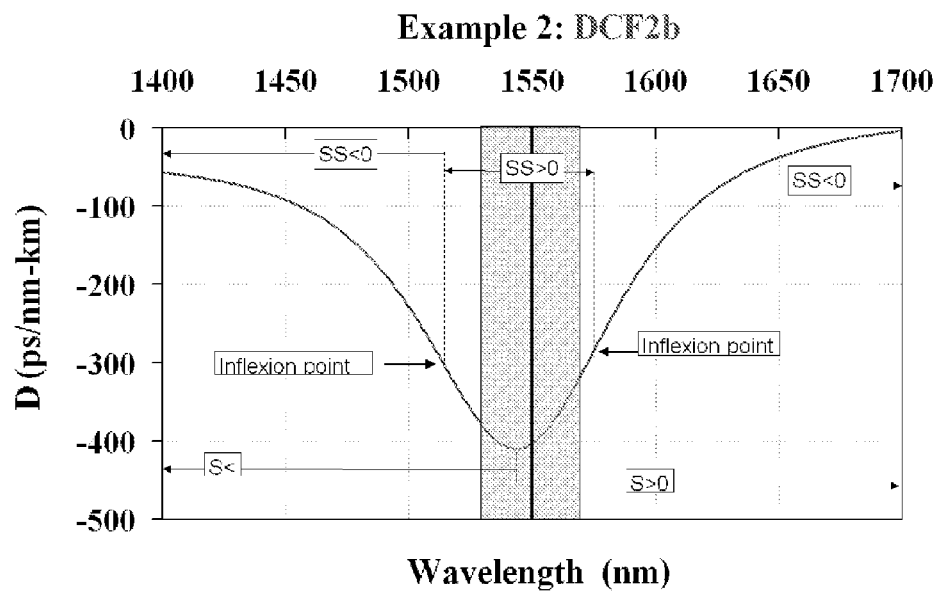
FIG. 7 illustrates the dispersion spectrum of another compensating fiber that may be associated according to the present invention with the fiber depicted in FIG. 4 to compensate the dispersion of a line fiber having a DOS of 100 nm at 1550 nm.

The dispersion fibers used in the present invention have an index profile schematically illustrated in FIG. 2. The profile in FIG. 2 has a central core of step shape, but trapezoidal or parabolic shapes (or shapes of power higher than two) may also be considered. This profile is also a set profile (i.e., representing the theoretical profile of the fiber). Those having ordinary skill in the art will appreciate that the fiber actually obtained after drawing from a preform may have a slightly different profile.

Each compensating fiber used in the optical system of the present invention includes a central core having a positive index difference $Dn_1$ with an outer optical cladding; a first inner, depressed cladding having a negative index difference $Dn_2$ with the outer cladding; a ring having a positive index difference $Dn_3$ with the outer cladding; and, optionally, a second depressed cladding having a negative index difference $Dn_4$ with the outer cladding. It is recalled that the outer cladding is the optical cladding. To define a fiber's index profile, generally the index value of the outer cladding is used as reference. The index values of the central core, depressed claddings and the ring are then presented as index differences $Dn_{1, 2, 3, 4}$.

For each of the four following examples, two tables are provided. A first table gives the optical characteristics of the fibers used in an example of the optical system according to the present invention, except one line relates to a conventional prior art DCF for the sake of comparison. Each first table gives the dispersion values D, the dispersion slope values S, and the slope of the slope of the dispersion values SS, as well as the DOS values given at the wavelength of 1550 nm. The lengths of compensating fibers to be used for 100 km of line fiber and the maximum residual dispersion in the C+ band are also given in each first table for Examples 1-4. A second table shows the index profiles of the compensating fibers used in the simulations of the four given examples for an optical system of the present invention. The relative index values are given at the wavelength of 633 nm.

EXAMPLE 1

In this first example, the line fiber of the transmission system has a DOS value of 50 nm. As explained previously, these line fibers are used in long-haul transmissions with high bit rates, and so it is important to be able to compensate the chromatic dispersion accumulated in these fibers while respecting this DOS value. The line fiber in this first example is the fiber marketed by Corning under the trademark LEAF, and the prior art compensating fiber mentioned in Table 1-I corresponds to a typical fiber having a DOS value of 50 nm required for compensating the dispersion of such a line fiber. It is noted, however, in Table 1-I and in FIG. 1 the compensation of a line fiber having a DOS as low as 50 nm using a single compensating fiber induces a high absolute value of residual dispersion on the edges of the spectral band under consideration. It can be seen in Table 1-I that this absolute value of maximum residual dispersion is reduced by one quarter when using two associated compensating fibers according to the present invention. Although the present invention requires a kilometer of compensating fibers, it offers greater freedom of choice for dispersions $D_1$ and $D_2$ and slopes $S_1$, $S_2$, and hence for the dispersion over slope values $DOS_1$ and $DOS_2$. The equations (3) and (4) must be met to provide a global DOS value of 50 nm for the compensating fibers in order to significantly reduce the absolute value of the residual chromatic dispersion on a given spectral band.

According to the present invention, a first compensating fiber $DCF_1$ is chosen having a negative value for the slope of the slope $SS_1$, and a second compensating fiber $DCF_2$ is chosen having a positive value for the slope of the slope of the dispersion $SS_2$, closely satisfying the equation (5) so that the absolute value of the residual dispersion is reduced.

TABLE 1-I

| Example 1 | D ps/ nm-km | S ps/ nm²-km | SS ps/ nm³-km | DOS nm | L km | $RD_{max}$ (1530-1570 nm) ps/nm-km |
|---|---|---|---|---|---|---|
| Line fiber | 4.25 | 0.085 | 0 | 50 | 100 | |
| DCF prior art | −150 | −3.00 | −0.0789 | 50 | 2.81 | −0.44 |
| $DCF_1$ | −80 | −2.00 | −0.0500 | 40 | 3.24 | −0.11 |
| $DCF_2$ | −381 | −4.59 | 0.2416 | 83 | 0.43 | |

TABLE 1-II

| Example 1 | $Dn_1$ (×10⁻³) | $Dn_2$ (×10⁻³) | $Dn_3$ (×10⁻³) | $r_1$ (μm) | $r_2$ (μm) | $r_3$ (μm) |
|---|---|---|---|---|---|---|
| $DCF_1$ | 19.2 | −22.0 | 16.0 | 1.94 | 5.23 | 6.65 |
| $DCF_2$ | 18.0 | −14.1 | 15.0 | 1.85 | 6.00 | 7.40 |

EXAMPLE 2

In this second example, the line fiber of the transmission system has a DOS of 100 nm. The line fiber in this first example is the line fiber marketed by OFS under the trade name TRUEWAVE® RS, and the prior art compensating fiber mentioned in Table 2-I corresponds to a typical fiber having the DOS value of 100 nm required to compensate the dispersion of such a line fiber. Table 2-I shows that the absolute value of the residual dispersion can be reduced by half when using two associated compensating fibers according to the present invention as compared with the use of a single compensating fiber.

In this example, two different second compensating fibers $DCF_2$ and $DCF_{2b}$ were associated with a first compensating fiber $DCF_1$, and a third compensating fiber $DCF_3$ was associated with fibers $DCF_1$ and $DCF_2$. It is particularly noted that it is possible to choose a compensating fiber $DCF_{2b}$ with a positive dispersion slope S even though the line fiber has a positive dispersion slope. This choice is possible because the dispersion slope is compensated by the association of two fibers. One is able to have a positive dispersion slope while the second has a negative dispersion slope, which allows the required compensation for the length under consideration as shown by equation (4).

Additionally, as in Example 1, it is noted that a first compensating fiber $DCF_1$ is chosen with a negative slope of the slope of the dispersion $SS_1$ and a second compensating fiber $DCF_2$, $DCF_{2b}$ is chosen with a positive slope of the slope of the dispersion $SS_2$, $SS_{2b}$. In this manner, a strong reduction in the slope of the dispersion slope is obtained, leading to a reduced absolute value of residual dispersion. It is also noted that by associating a third fiber $DCF_3$ with the two first fibers $DCF_1$ and $DCF_2$, the residual dispersion can be practically cancelled.

This improved compensation of the chromatic dispersion is achieved for a limited spectral band approximately 40 nm wide. As shown in FIGS. 3-7, the dispersion of a compensating fiber in relation to wavelength is not linear, nor is it parabolic if several spectral bands are considered (e.g., from 1400 nm to 1700 nm). It is found that the graphs of dispersion as a function of the wavelength have points of inflection representing sign inversion of the slope of the slope.

On the other hand, if a limited spectral band is considered (e.g., the C+ band shown in the shaded areas in FIGS. 3-7), the dispersion spectrum of the compensating fiber may be closely approximated by a parabola, with a substantially constant value for the slope of the dispersion slope. The compensating fibers are always chosen so that at least two thereof have values of the slope of the dispersion slope of opposite signs, and typically whose dispersion spectra have no point of inflection in the spectral band under consideration. It is also possible to choose compensating fibers having points of inflection on either side of the spectral band under consideration.

Figure 8:
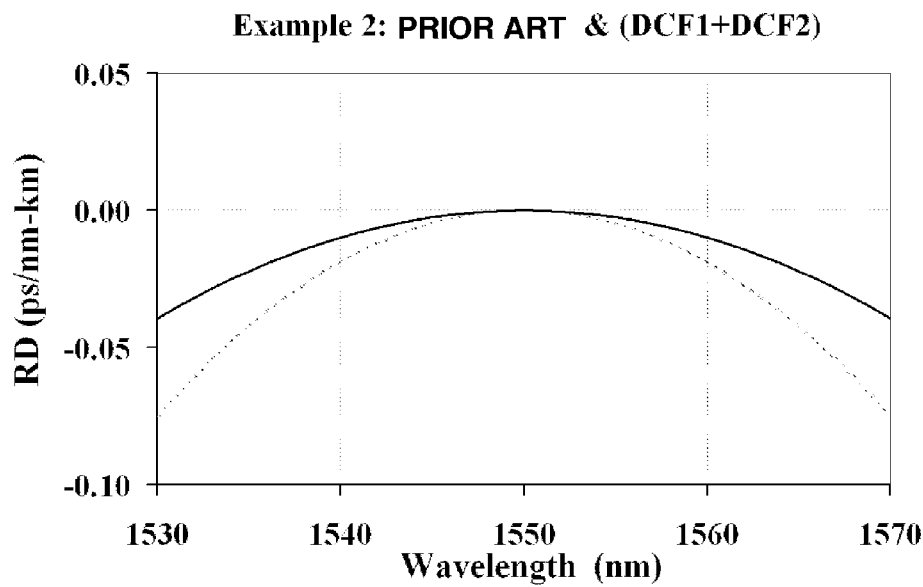
FIG. 8 illustrates the residual dispersion spectra over the C+ band for a transmission system using the prior art compensating fiber depicted in FIG. 3 and for a transmission system using the association of the fibers depicted in FIGS. 4 and 5.
Figure 9:
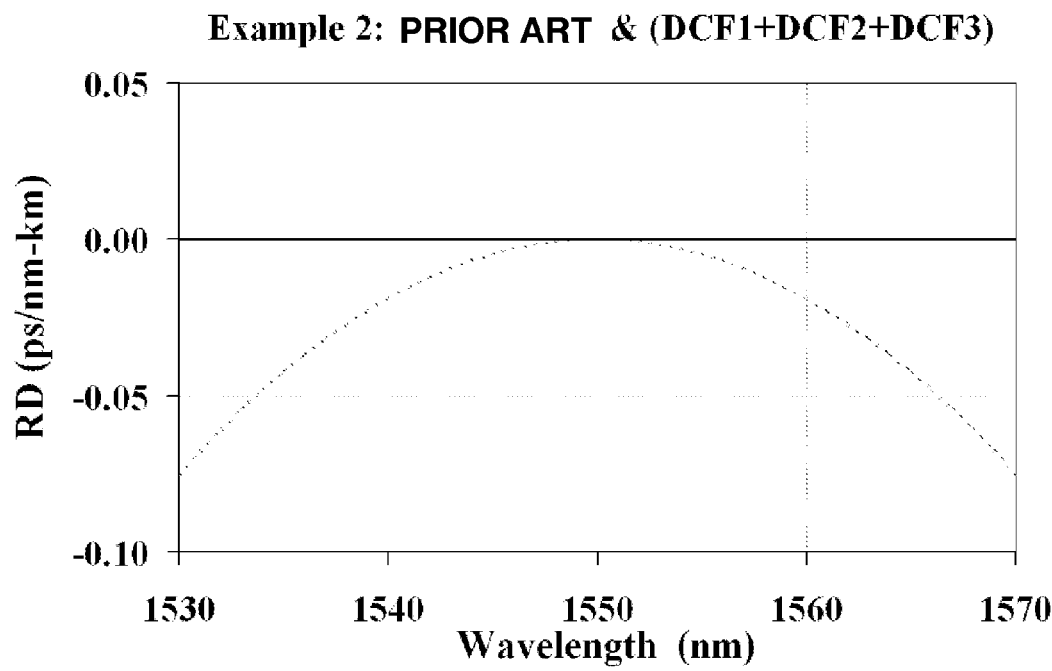
FIG. 9 illustrates the residual dispersion spectra on the C+ band for a transmission system using the prior art compensating fiber depicted in FIG. 3 and for a transmission system using the association of the fibers depicted in FIGS. 4, 5 and 6.
Figure 10:
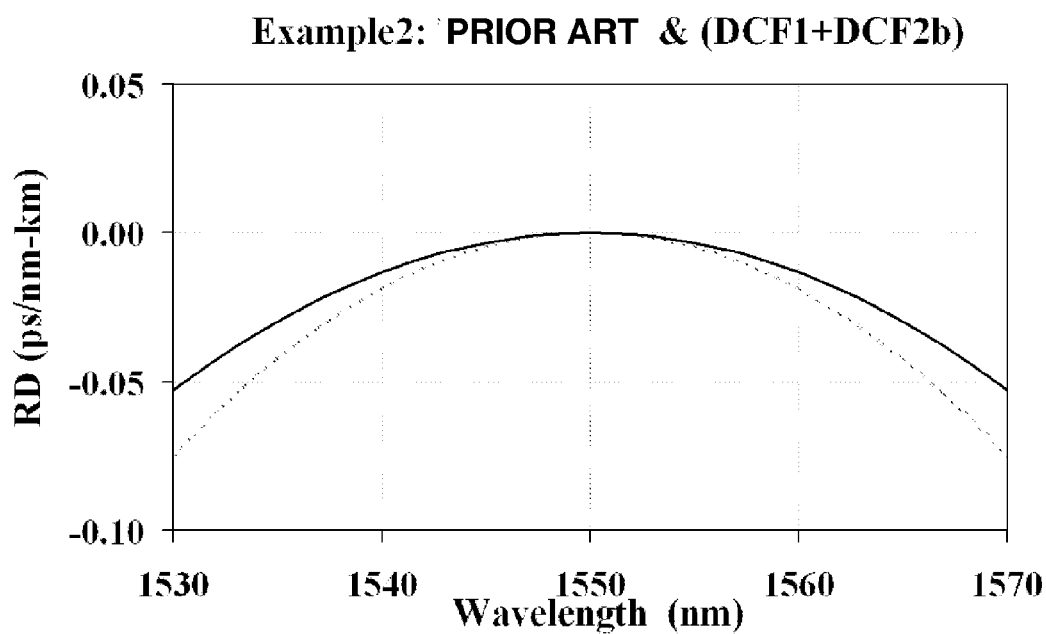
FIG. 10 illustrates the residual dispersion spectra on the C+ band for a transmission system using the prior art compensating fiber in FIG. 3 and for a transmission system using the association of the fibers depicted in FIGS. 4 and 7.

FIGS. 8, 9 and 10 illustrate the results obtained with two and three associated compensating fibers according to the present invention as compared with a single compensating fiber. The curve shown as a thin dashed line reproduces the residual dispersion introduced by a conventional compensating fiber (i.e., the fiber in FIG. 3) and the curve in a thick solid line reproduces the residual dispersion introduced by the association of at least two compensating fibers according to the present invention ($DCF_1+DCF_2$, $DCF_1+DCF_2+DCF_3$ and $DCF_1+DCF_{2b}$).

These figures illustrate the values given in Table 2-I, and clearly show that the absolute value of the residual dispersion on the edge of the spectral band is greatly reduced by associating two compensating fibers having values of the slope of the dispersion slope of opposite signs, and can even be cancelled by associating three compensating fibers of which at least two have values of the slope of the dispersion slope of opposite signs.

TABLE 2-I

| Example 2 | D ps/nm-km | S ps/nm$^2$-km | SS ps/nm$^3$-km | DOS nm | L km | RD$_{max}$ (1530-1570 nm) ps/nm-km |
|---|---|---|---|---|---|---|
| Line fiber | 4.5 | 0.045 | 0 | 100 | 100 | |
| DCF prior art | −150 | −1.50 | −0.0125 | 100 | 3.00 | −0.075 |
| DCF$_1$ | −125 | −1.39 | −0.0158 | 90 | 2.38 | −0.039 |
| DCF$_2$ | −253 | −1.98 | 0.0299 | 128 | 0.60 | |
| DCF$_1$ | −125 | −1.39 | −0.0158 | 90 | 1.34 | 0.000 |
| DCF$_2$ | −253 | −1.98 | 0.0299 | 128 | 0.49 | |
| DCF$_3$ | −216 | −2.27 | 0.009 | 95 | 0.73 | |
| DCF$_1$ | −125 | −1.39 | −0.0158 | 90 | 3.34 | −0.053 |
| DCF$_{28}$ | −403 | −2.09 | 0.3480 | −193 | 0.08 | |

TABLE 2-II

| Example 2 | Dn$_1$ (×10$^{-3}$) | Dn$_2$ (×10$^{-3}$) | Dn$_3$ (×10$^{-3}$) | r$_1$ (μm) | r$_2$ (μm) | r$_3$ (μm) |
|---|---|---|---|---|---|---|
| DCF$_1$ | 24.0 | −15.0 | 6.0 | 1.59 | 4.22 | 7.10 |
| DCF$_2$ | 22.2 | −11.3 | 7.3 | 1.56 | 4.78 | 7.33 |
| DCF$_3$ | 20.5 | −9.1 | 6.8 | 1.58 | 5.33 | 7.75 |
| DCF$_{2b}$ | 22.3 | −5.6 | 8.1 | 1.39 | 6.87 | 9.10 |

EXAMPLE 3

In this third example, the line fiber of the transmission system has a DOS of 154 nm. The line fiber in this third example is the fiber marketed under the trade name TERALIGHT® by Draka Comteq, and the prior art compensating fiber mentioned in Table 3-I corresponds to a typical fiber having a DOS value of 154 nm required for compensating the dispersion of such a line fiber. Table 3-I shows that the absolute value of the residual dispersion can be practically cancelled when using two associated compensating fibers according to the present invention as compared with the use of a single compensating fiber.

TABLE 3-I

| Example 3 | D ps/nm-km | S ps/nm$^2$-km | SS ps/nm$^3$-km | DOS nm | L km | RD$_{max}$ (1530-1570 nm) ps/nm-km |
|---|---|---|---|---|---|---|
| Line fiber | 8.00 | 0.052 | 0 | 154 | 100 | |
| DCF prior art | −150 | −0.97 | −0.0049 | 154 | 5.33 | −0.052 |
| DCF$_1$ | −100 | −0.77 | −0.0038 | 130 | 3.47 | −0.002 |
| DCF$_2$ | −250 | −1.40 | 0.0070 | 179 | 1.81 | |

TABLE 3-II

| Example 3 | Dn$_1$ (×10$^{-3}$) | Dn$_2$ (×10$^{-3}$) | Dn$_3$ (×10$^{-3}$) | r$_1$ (μm) | r$_2$ (μm) | r$_3$ (μm) |
|---|---|---|---|---|---|---|
| DCF$_1$ | 20.5 | −11.9 | 6.0 | 1.73 | 4.39 | 7.12 |
| DCF$_2$ | 31.6 | −11.7 | 4.6 | 1.24 | 3.56 | 7.11 |

EXAMPLE 4

In this fourth example, the line fiber of the transmission system is a standard SMF and has a DOS of 300 nm. Such a line fiber can be compensated by any dispersion compensating fiber having a DOS of 300 nm. Table 4-I shows that the residual dispersion can be practically cancelled when using two associated compensating fibers according to the present invention as compared with the use of a single compensating fiber.

TABLE 4-I

| Example 4 | D ps/nm-km | S ps/nm$^2$-km | SS ps/nm$^3$-km | DOS nm | L km | RD$_{max}$ (1530-1570 nm) ps/nm-km |
|---|---|---|---|---|---|---|
| Line fiber | 17.40 | 0.058 | 0 | 300 | 100 | |
| DCF prior art | −150 | −0.50 | 0.0020 | 300 | 11.53 | 0.041 |
| DCF$_1$ | −80 | −0.32 | −0.0016 | 249 | 8.70 | −0.002 |
| DCF$_2$ | −236 | −0.69 | −0.0035 | 344 | 4.38 | |

TABLE 4-II

| Example 4 | Dn$_1$ (×10$^{-3}$) | Dn$_2$ (×10$^{-3}$) | Dn$_3$ (×10$^{-3}$) | r$_1$ (μm) | r$_2$ (μm) | r$_3$ (μm) |
|---|---|---|---|---|---|---|
| DCF$_1$ | 22.6 | −5.0 | 2.5 | 1.44 | 4.67 | 8.00 |
| DCF$_2$ | 40.0 | −8.3 | 7.3 | 0.99 | 3.70 | 5.09 |

The compensating fibers DCF$_i$ according to the present invention are therefore chosen such that their dispersions D$_i$, their slopes S$_i$, and their respective lengths L$_i$ satisfy the above-cited equations (3) and (4):

$$D_0(\lambda_0) \cdot L_0 + \sum_i (D_i(\lambda_0) \cdot Li) = 0$$

$$S_0(\lambda_0) \cdot L_0 + \sum_i (S_i(\lambda_0) \cdot Li) = 0$$

such that at least two thereof have given values for the slope of the slope of the dispersion SS$_i$ at the median wavelength $\lambda_0$ of a spectral band under consideration that are of opposite signs.

Typically, the compensating fibers DCF$_i$ are chosen such that the absolute value of the residual dispersion given by the aforementioned equation (9) is less than 0.4 ps/nm-km over the entire spectral band under consideration, namely:

$$|RD(\lambda)| = \left| \frac{\sum_i (SS_i(\lambda_0) \cdot L_i)}{2L_0} (\lambda - \lambda_0)^2 \right| < 0.4 \, \text{ps/nm} - \text{km}$$

which, for a spectral band of no more than 40 nm, gives:

$$\left| \frac{\sum_i (SS_i(\lambda_0) \cdot L_i)}{L_0} \right| < 0.002 \, \text{ps/nm}^3/\text{km} \quad (10)$$

Variations ranging up to 5 percent of the lengths L$_i$ of the chosen DCF$_i$ fibers may be considered, particularly if it is not desired to target exactly zero accumulated dispersion at the median wavelength $\lambda_0$ of the spectral band under consideration, but rather a value of a few dozen ps/nm, for example.

The present invention is not limited to the examples and particular embodiments described as examples above. In particular, other associations of dispersion compensating fibers may be considered within the scope of the invention for as long as the constraint imposed on the slope of the slope of the dispersion is observed (i.e., at least two DCF fibers have values of the slope of the slope of the dispersion that are of opposite signs). Also, the index and radius values given in the examples may be adapted without departing from the scope of the invention, in order to achieve targeted dispersion values, values for the slope and values for the slope of the slope of the dispersion and/or to observe other constraints imposed on the fiber in terms of effective area, cut-off wavelength, bend losses or other.

The invention claimed is:

1. An optical transmission system over a given spectral band, the system comprising:
    a given length ($L_0$) of an optical transmission fiber having, at a median wavelength ($\lambda_0$) of the given spectral band, a given chromatic dispersion $D_0(\lambda_0)$ and a given slope of the chromatic dispersion $S_0(\lambda_0)$; and
    at least two chromatic dispersion compensating fibers ($DCF_i$) of respective length ($L_i$), each dispersion compensating fiber having, at the median wavelength ($\lambda_0$), given values of chromatic dispersion $D_i(\lambda_0)$ and of slope of the chromatic dispersion $S_i(\lambda_0)$ that substantially satisfy the following equations:

$$D_0(\lambda_0) \cdot L_0 + \sum_i (D_i(\lambda_0) \cdot Li) = 0 \text{ ps/nm}$$

$$S_0(\lambda_0) \cdot L_0 + \sum_i (S_i(\lambda_0) \cdot Li) = 0 \text{ ps/nm}^2$$

wherein at least two of the dispersion compensating fibers have values for the slope of the slope of the dispersion $SS_i(\lambda_0)$ of opposite signs.

2. An optical transmission system according to claim 1, wherein the values for the slope of the slope of the dispersion ($SS_i$) of the compensation fibers ($DCF_i$) also substantially satisfy the following equation:

$$\left| \frac{\sum_i (SS_i(\lambda_0) \cdot L_i)}{L_0} \right| < 0.002 \text{ ps/nm}^3/\text{km}.$$

3. An optical transmission system according to claim 1, wherein the given spectral band has a spectral width that is 40 nm or less.

4. An optical transmission system according to claim 1, wherein the given spectral band is chosen from among all or part of the C or C+ band, the L band, or the S band.

5. An optical transmission system according to claim 1, wherein, at the median wavelength ($\lambda_0$) of the given spectral band, the optical transmission fiber has a DOS value of less than 150 nm.

6. An optical transmission system over a spectral band having a spectral width of about 40 nm or less, the system comprising:
    a given length ($L_0$) of an optical transmission fiber having, at a median wavelength ($\lambda_0$) of the given spectral band, a given chromatic dispersion $D_0(\lambda_0)$ and a given slope of the chromatic dispersion $S_0(\lambda_0)$; and
    at least two chromatic dispersion compensating fibers ($DCF_i$) of respective length ($L_i$), the chromatic dispersion compensating fibers in communication with the optical transmission fiber;
    wherein each dispersion compensating fiber has, at the median wavelength ($\lambda_0$), given values of chromatic dispersion $D_i(\lambda_0)$ and of slope of the chromatic dispersion $S_i(\lambda_0)$ that substantially satisfy the following equations:

$$D_0(\lambda_0) \cdot L_0 + \sum_i (D_i(\lambda_0) \cdot Li) = 0 \text{ ps/nm}$$

$$S_0(\lambda_0) \cdot L_0 + \sum_i (S_i(\lambda_0) \cdot Li) = 0 \text{ ps/nm}^2$$

wherein at least two of the dispersion compensating fibers have values for the slope of the slope of the dispersion $SS_i(\lambda_0)$ of opposite signs; and
    wherein the values for the slope of the slope of the dispersion ($SS_i$) of the compensation fibers ($DCF_i$) also substantially satisfy the following equation:

$$\left| \frac{\sum_i (SS_i(\lambda_0) \cdot L_i)}{L_0} \right| < 0.002 \text{ ps/nm}^3/\text{km}.$$

7. An optical transmission system according to claim 6, wherein the given spectral band has a spectral width that is 35 nm or less.

8. An optical transmission system according to claim 6, wherein, at the median wavelength ($\lambda_0$) of the given spectral band, the optical transmission fiber has a DOS value of less than about 100 nm.

9. A method for compensating the chromatic dispersion of a given length ($L_0$) of a transmission fiber over a given spectral band, the method comprising:
    selecting at least two chromatic dispersion compensating fibers ($DCF_i$) each having a given value for the slope of the slope of the dispersion ($SS_i$) at a median wavelength ($\lambda_0$) of the given spectral band, at least two dispersion compensating fibers being chosen with values for the slope of the slope of the dispersion $SS_i(\lambda_0)$ of opposite signs; and
    assembling given lengths ($L_i$) of each dispersion compensating fiber;
    wherein the dispersion compensating fibers are selected and the lengths of each selected fiber are chosen to substantially satisfy the following equation:

$$\left| \frac{\sum_i (SS_i(\lambda_0) \cdot L_i)}{L_0} \right| < 0.002 \text{ ps/nm}^3/\text{km}.$$

10. The method for compensating the chromatic dispersion of claim 9, wherein the dispersion compensating fibers ($DCF_i$) are selected to substantially satisfy the following equations:

$$D_0(\lambda_0) \cdot L_0 + \sum_i (D_i(\lambda_0) \cdot Li) = 0 \text{ ps/nm}$$

$$S_0(\lambda_0) \cdot L_0 + \sum_i (S_i(\lambda_0) \cdot Li) = 0 \text{ ps/nm}^2$$

and wherein $D_i(\lambda_0)$ and $S_i(\lambda_0)$, respectively, are the values of dispersion and dispersion slope of the dispersion compensating fibers at the median wavelength ($\lambda_0$) of the given spectral band, and the transmission fiber of the length ($L_0$) has, at the median wavelength ($\lambda_0$) of the given spectral band, a given chromatic dispersion $D_0(\lambda_0)$ and a given slope of the chromatic dispersion $S_0(\lambda_0)$.

* * * * *

UNITED STATES PATENT AND TRADEMARK OFFICE
CERTIFICATE OF CORRECTION

PATENT NO. : 7,483,613 B2
APPLICATION NO. : 11/934451
DATED : January 27, 2009
INVENTOR(S) : Marianne Bigot-Astruc et al.

Page 1 of 1

It is certified that error appears in the above-identified patent and that said Letters Patent is hereby corrected as shown below:

In the Specification:

Column 4, line 11 reads "ing fiber having, at the ~~medium~~ wavelength ($\lambda_0$), values of"
and should read "ing fiber having, at the median wavelength ($\lambda_0$), values of"

Column 8, line 5, Equation No. 7 is depicted as:

$$\frac{[\cancel{S_0(\lambda) \cdot D_1(\lambda_0) - D_0(\lambda_0) \cdot S_1(\lambda_0)}]}{[D_2(\lambda_0) \cdot S_1(\lambda_0) - S_2(\lambda_0) \cdot D_1(\lambda_0)]}$$

and should be depicted as:

$$\frac{[S_0(\lambda_0) \cdot D_1(\lambda_0) - D_0(\lambda_0) \cdot S_1(\lambda_0)]}{[D_2(\lambda_0) \cdot S_1(\lambda_0) - S_2(\lambda_0) \cdot D_1(\lambda_0)]}$$

Column 11, in Table 2-I, line 21 reads: ~~DCF$_{2B}$~~ -403 ~~2.09~~ 0.3480 -193 0.08
and should read: DCF$_{2b}$ -403 2.09 0.3480 -193 0.08

Column 12, in Table 4-I, line 21 reads: DCF$_2$ -236 -0.69 ~~0.0035~~ 344 4.38
and should read: DCF$_2$ -236 -0.69 0.0035 344 4.38

Column 12, in Table 4-II, line 28 reads: DCF$_1$ 22.6 -5.0 2.5 1.44 4.67 ~~8.00~~
and should read: DCF$_1$ 22.6 -5.0 2.5 1.44 4.67 9.00

Signed and Sealed this

Twelfth Day of January, 2010

David J. Kappos
*Director of the United States Patent and Trademark Office*